(12) United States Patent
Rodmell

(10) Patent No.: US 9,898,387 B2
(45) Date of Patent: Feb. 20, 2018

(54) DEVELOPMENT TOOLS FOR LOGGING AND ANALYZING SOFTWARE BUGS

(71) Applicant: CA, INC., Islandia, NY (US)

(72) Inventor: Mark Daniel Rodmell, Prague (CZ)

(73) Assignee: CA, INC., Islandia, NY (US)

( * ) Notice: Subject to any disclaimer, the term of this patent is extended or adjusted under 35 U.S.C. 154(b) by 0 days.

(21) Appl. No.: 14/222,045

(22) Filed: Mar. 21, 2014

(65) Prior Publication Data

US 2015/0269060 A1 Sep. 24, 2015

(51) Int. Cl.
  G06F 11/36 (2006.01)
  G06F 9/45 (2006.01)
  G06F 9/44 (2018.01)

(52) U.S. Cl.
  CPC ............ *G06F 11/3664* (2013.01); *G06F 8/33* (2013.01); *G06F 8/43* (2013.01)

(58) Field of Classification Search
  None
  See application file for complete search history.

(56) References Cited

U.S. PATENT DOCUMENTS

| | | | |
|---|---|---|---|
| 2005/0155013 A1* | 7/2005 | Carrigan | G06F 8/71 717/101 |
| 2007/0079231 A1* | 4/2007 | Ahyh | G06F 8/36 715/204 |
| 2009/0172514 A1* | 7/2009 | Radovanovic | G06F 17/30864 715/212 |
| 2010/0125573 A1* | 5/2010 | Venolia | G06F 17/30991 707/722 |
| 2010/0325619 A1* | 12/2010 | Song et al. | 717/143 |
| 2011/0320876 A1* | 12/2011 | Klein | G06F 8/33 714/38.1 |
| 2013/0007700 A1* | 1/2013 | Villar | G06F 8/33 717/109 |
| 2013/0152047 A1* | 6/2013 | Moorthi | G06F 11/368 717/124 |
| 2015/0082276 A1* | 3/2015 | Balachandran | G06F 8/30 717/112 |

OTHER PUBLICATIONS

Hartmann et al. "What would other programmers do: suggesting solutions to error messages." Proceedings of the SIGCHI Conference on Human Factors in Computing Systems. ACM, 2010.*
Mujumdar et al. "Crowdsourcing suggestions to programming problems for dynamic web development languages." CHI'11 Extended Abstracts on Human Factors in Computing Systems. ACM, 2011.*

* cited by examiner

*Primary Examiner* — Chameli Das
*Assistant Examiner* — Joanne Macasiano
(74) *Attorney, Agent, or Firm* — Sage Patent Group

(57) ABSTRACT

Methods of debugging code in a development environment are provided including compiling code in the development environment; receiving an error message for an error encountered in the compiled code; and automatically receiving a plurality of suggested resolutions for the error in the compiled code. The plurality of suggested resolutions are based on past resolutions of errors associated with a plurality of developers stored in a common database. The plurality of suggested resolutions are provided in order of relevancy based on a plurality of relevancy metrics. Related systems and computer program products are provided.

18 Claims, 12 Drawing Sheets

```
Include\Subpath.h  [Graph Algorithm2] - Code::Blocks                                                                                        _□X
Management    X    <  src\ShortesPath.cpp X  new  Index\Graph Algorithm\main.cpp X  Include\Historical.h X  Include\Graph.h X  Include\PriorityQueue.h X  Include\ShortestPath.h X  src\test.cpp X  Include\test.h X  src\test1.cpp X  Include\test1.h X  src\test1.cpp X  Include\Subpath.h X  SubPath.cpp X
[Projects][Symbols][Files]  1   #ifdef SUBPATH_H
 Workspace                  2   #define SUBPATH_H
 ⊟ Graph Algorithm2         3
   ⊞ Sources                4   Class PriorityQueue:
   ⊞ Headers                5
                            6   class SubPath
                            7   {
                            8   public:
                            9     SubPath (Graph*);
                           10     virtual ~SubPath();
                           11     vector<int> vertices();    //list of vertices in the graph
                           12
                           13     vector<int> path (int source, int destination);    //return a list of nodes constituting the shortest path between 2 nodes .
                           14
                           15     int path_size (int source, int destination) const;   //return total shortest path cost between 2 nodes
                           16
                           17   private:
                           18     PriorityQueue* ptrPriorityQueue
                           19     Graph* ptrGraph;
                           20     const int infiniteDist;
                           21
                           22   };
                           23   #endif // SUBPATH_H
                           24
[Code::Blocks X][Search Results X][Cccc X][Build log X][Build messages X][CppCheck X][CppCheck messages X][Cscope X][Debugger X][DoxyBlocks X][Closed files list X][Thread search X][Historical Solutions X]
...\...\include\...  9    error: expected ')' before '*' token
...\...\include\... 11    error: 'vector' does not name a type
...\...\include\... 13    error: 'vector' does not name a type
...\...\include\... 19    error: 'graph' does not name a type
...\...\include\... 20    warning: non-static const member 'const int SubPath::infiniteDist' in class without a ....
                                                                                                                    471
```

FIGURE 4

| Error Message | File Name | Tags | Age |
|---|---|---|---|
| Error: expected ')' before '*' | ShortestPath.h | 3 | 1 Year 2 Months |
| Error: expected ')' before '*' | PriorityQueue.h | 2 | 1 Year 6 Months |
| Error: expected ')' before '*' | HexBoard.h | 2 | 1 year 8 Months |

*FIGURE 5*

Resolution 1: Detail View

Age: 1 year, 2 Months    Tags: 3
                              Last Tag Age: 1 Month

Error Messages:

```
File           Line  Message
                     === Graph Algorithm2_Debug ===
..\..\include\...  18   error: expected ')' before '*' token
..\..\include\...  33   warning: non-static const member 'const int ShortestPath::infiniteDist' in class with...
C:\Users\rpcms...  12   error: prototype for 'ShortestPath::ShortestPath(Graph*)' does not match any in class ...
..\..\include\...  14   error: candidates are: ShortestPath::ShortestPath(const ShortestPath&)
```

Failing Code:

```
#include <vector>
#include "Graph.h"
#include "PriorityQueue.h"

using namespace std;

class ShortestPath [illegible]
{ class ShortestPath
{
public:
    ShortestPath(Graph3D* graph_ptr);
    ~ShortestPath();
    vector<int> vertices();
    vector<int> path(int source, int destination);
    int path_size(int source, int destination) const;
```

Corrected Code:

```
#include <vector>
#include "Graph.h"
#include "PriorityQueue.h"

using namespace std;

class ShortestPath [illegible]

class ShortestPath
{
public:
    ShortestPath(Graph* graph_ptr);
    ~ShortestPath();
    vector<int> vertices();
    vector<int> path(int source, int destination);
    int path_size(int source, int destination) const;
```

*FIGURE 6*

Resolution 2: Detail View

Age: 1 year, 6 Months  Tags: 2
Last Tag Age: 2 Months

Error Messages:

| File | Line | Message |
|---|---|---|
| ..\..\include\PriorityQueue.h<br>..\..\include\PriorityQueue.h | 16 | error: expected ';' before ':' token |
|  | 49 | warning: non-static const member 'const int PriorityQueue::infiniteDist' in class with... |
| c:\Users\rodma07\Documents\C++ Course\Graph\src\Graph.cpp |  | In constructor 'Graph::Graph(int, double, int, int)': |
| c:\Users\rodma07\Documents\C++ Course\Graph\src\Graph.cpp | 62 | error: no matching function for call to 'PriorityQueue::PriorityQueue(Graph* const)' |
| c:\Users\rodma07\Documents\C++ Course\Graph\src\Graph.cpp | 62 | note: candidates are: |

Failing Code:

```
define PRIORITYQUEUE_H using namespace std;

class PriorityQueue
//////////////////////////////////
//////////////////////////////////
////////////////////////////////// class PriorityQueue
{
public:

PriorityQueue(Graph*);

int get_previous_node(int);

void set_previous_node(int, int);

int get_node_value(int);
```

Corrected Code:

```
#ifndef PRIORITYQUEUE_H
define PRIORITYQUEUE_H using namespace std;

class Graph;
//////////////////////////////////
//////////////////////////////////
//////////////////////////////////
////////////////////////////////// class PriorityQueue
{};

public:

PriorityQueue(Graph*);

int get_previous_node(int);
```

*FIGURE 7*

Resolution 3: Detail View

Age: 1 year, 8 Months　　　　Tags: 2
　　　　　　　　　　　　　　　　Last Tag Age: 3 Months

Error Messages:

| File | Line | Message |
|---|---|---|
| ..\..\include\HexBoard.h | 7 | error: expected ')' before '*' token |
| ..\..\include\HexBoard.h | 13 | error: 'Graph' does not name a type |
| ..\..\include\HexBoard.h | 15 | error: 'vector' does not name a type |
| ..\..\include\HexBoard.h | 14 | warning: non-static const member 'const int HexBoard::boardSize' in class without a co... |
| C:\Users\rodma0\Documents\C++ Course\Graph\src\HexBoard.cpp | 3 | error: expected constructor, destructor, or type conversion before '/' token |

Failing Code:

```
#ifndef HEXBOARD_H
define HEXBOARD_H class HexBoard
{
public:
    HexBoard(Graph*, int);
    HexBoard();
    ~HexBoard();
    void print_board();
    bool make_move(int, int, char);
private:
    Graph* ptrHexBoard;
    const int boardSize;
    vector<char> vertexState;
};

#endif // HEXBOARD_H
```

Corrected Code:

```
#ifndef HEXBOARD_H
define HEXBOARD_H
#include "Graph.h"

class HexBoard
{
public:
    HexBoard(Graph*, int);
    HexBoard();
    ~HexBoard();
    void print_board();
    bool make_move(int, int, char);
private:
    Graph* ptrHexBoard;
    const int boardSize;
    vector<char> vertexState;
};

#endif // HEXBOARD_H
```

DEVELOPMENT TOOLS FOR LOGGING AND ANALYZING SOFTWARE BUGS

BACKGROUND

Various embodiments described herein relate to computer systems, methods and computer program products for software development and, more particularly, computer systems, methods and computer program products for debugging software for computer systems.

Today's software developers typically use integrated development environments (IDEs) or interactive development environments (referred to collectively herein as "IDEs") when developing software for new applications. An IDE is a software application that provides comprehensive facilities to software developers (computer programmers) for software development. IDEs are designed to increase developer productivity by providing tight-knit components with similar user interfaces. IDEs present a single program in which all development can be done. These environments typically provide many features for authoring, modifying, compiling, deploying and debugging software. However, even in these environments, software developers inevitably make mistakes when writing code, which ultimately makes the developers less productive.

SUMMARY

Some embodiments of the present inventive concept provide methods of debugging code in a development environment including compiling code in the development environment; receiving an error message for an error encountered in the compiled code; and automatically receiving a plurality of suggested resolutions for the error in the compiled code. The plurality of suggested resolutions are based on past resolutions of errors associated with a plurality of developers stored in a common database. The plurality of suggested resolutions are provided in order of relevancy based on a plurality of relevancy metrics.

Related systems and computer program products are also provided herein.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

FIG. 4 is a screen shot of a graphical user interface produced with the error tracking module in accordance with some embodiments of the present inventive concept.

FIG. 5 is an example listing of resolutions for the errors located in FIG. 4 in accordance with some embodiments of the present inventive concept.

FIGS. 6-8 are detail views of the possible resolutions illustrated in FIG. 5 in accordance with some embodiments of the present inventive concept.

DETAILED DESCRIPTION

Figure 1:
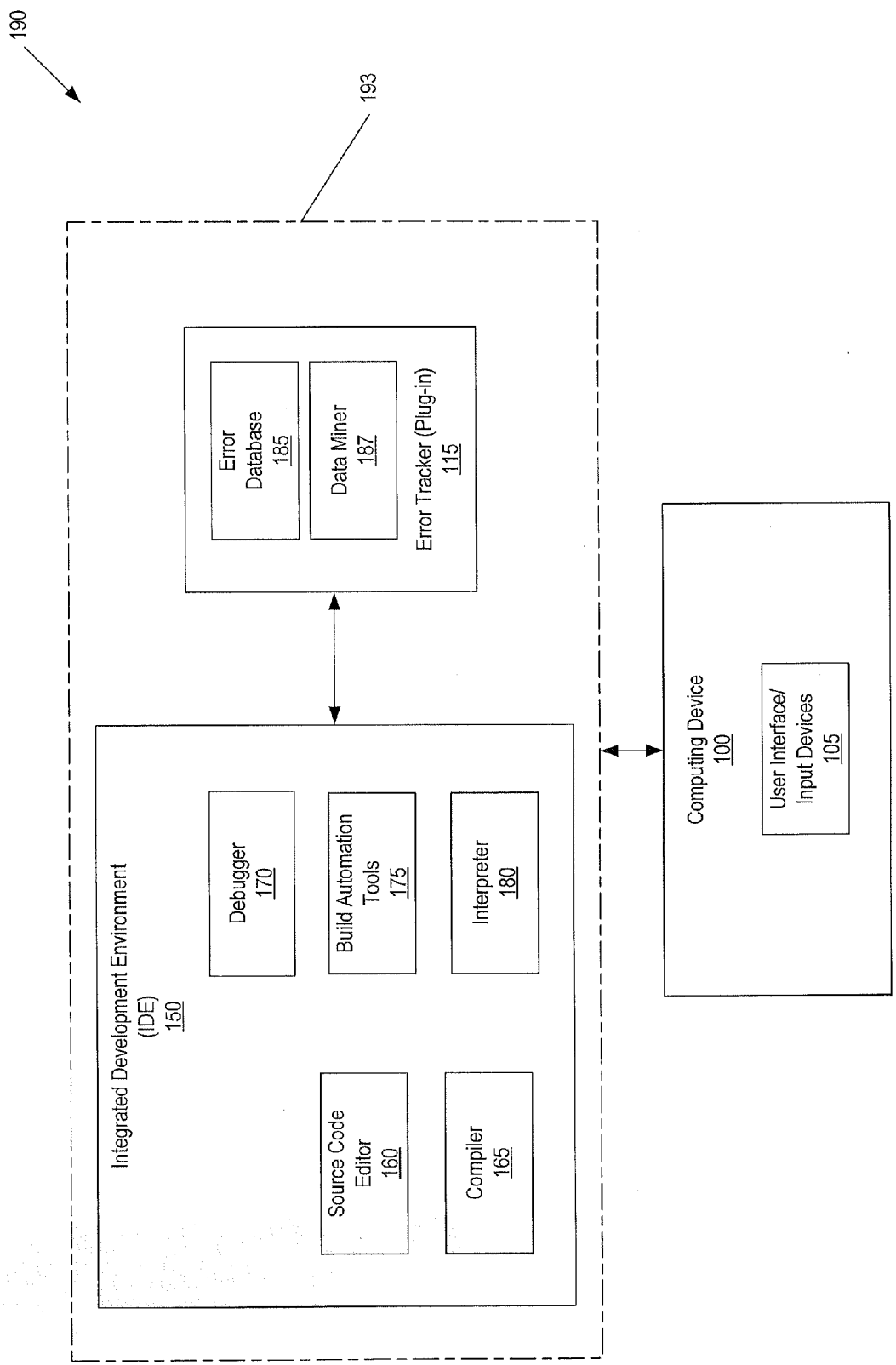
FIG. 1 is a block diagram of an integrated development environment (IDE) including an error tracker in accordance with some embodiments of the present inventive concept.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein, a computing system or environment may include one or more hosts, operating systems, peripherals, and/or applications. Machines in a same computing system or environment may have shared memory or resources, may be associated with the same or different hardware platforms, and/or may be located in the same or different physical locations. Computing systems/environments described herein may refer to a virtualized environment (such as a cloud environment) and/or a physical environment.

As discussed above, most modern software development is performed in an integrated development environment (IDE). These environments can make a software developer more efficient. However, inevitably mistakes will be made, decreasing a developer's efficiency. Furthermore, training new developers on existing applications, for example, mainframe legacy applications, may be difficult. The code is unfamiliar to the new developer, therefore, at first, many mistakes may be made, lowering developer productivity. In many cases, these new developers are merely repeating the same types of errors that have been made by their colleagues in the past, often calling for similar solutions.

Accordingly, some embodiments of the present inventive concept provide a debugging aid that uses this past knowledge of errors/resolutions to assist current developers in debugging their current code. In particular, some embodiments of the present inventive concept provide a common error database including historical information with respect to errors and their associated resolutions (error/resolution pairs) through history of the product and/or previous products. In particular, embodiments of the present inventive concept focus on storing real time build errors, no matter how small. In further embodiments, the common error database includes errors associated with run-time diagnostics during debugging in the IDE. For example, many modern IDEs are capable of predicting when the developer's code is likely to crash when actually run using, for example, static code analysis. An error/warning message is provided to the developer to highlight, for example, memory leaks, buffer overloads and the like. These runtime errors and associated resolutions can be captured and stored in the error database in accordance with some embodiments of the present inventive concept. Thus, as used herein, "run-time errors" refers to run time errors that are diagnosed at compile time in the IDE by the developer.

Expanding the scope of error recording may increase the usefulness of the dataset stored in the common error database. For example, storing not only the coding defects, but also how these coding defects were resolved, allows a developer that receives a particular error to pull up the error tracker in accordance with embodiments discussed herein and examine if that same, or similar, error has occurred in the same location in the past and quickly reveal possible solutions in real time. Thus, over time as more error/resolution pairs are stored in the common error database, developers may have a solution to an error encountered while coding at their fingertips as will be discussed further herein with respect to FIGS. 1 through 14 below.

Furthermore, the use of the common error database is not limited to use as a debugging tool. For example, the information in the common error database can be used to glean architectural weaknesses and predict the most likely causes of failure, such as answering a question whether a particular module is more susceptible to runtime error in a particular subroutine. Although only a few secondary uses for the common error database are discussed herein, embodiments of the present inventive concept are not limited to these examples. The common error database can be mined for and used in any conceivable fashion without deviating from the scope of the present inventive concept.

Referring first to FIG. 1, an IDE system 190 in accordance with some embodiments of the present inventive concept will be discussed. Although embodiments of the present inventive concept are discussed as being performed in an IDE, embodiments are not limited to this environment. Any environment suitable for code development may be used without departing from the scope of the present inventive concept.

As illustrated in FIG. 1, the IDE system 190 includes an IDE 150, an error tracker 115 and a computing device 100 for interacting with the IDE 150 and the error tracker 115. Although the IDE 150 and the error tracker 115 in accordance with embodiments of the present inventive concept are illustrated as separate modules in FIG. 1, embodiments of the present inventive concept are not limited to this configuration. In particular, the error tracker 115 may be a separate module or plug-in module as illustrated in FIG. 1. However, the error tracker 115 may also be included in the IDE directly as indicated by the dotted line 193 of FIG. 1. Thus, the error tracker 115 in accordance with embodiments of the present inventive concept may operate in many ways without departing from the scope of the present inventive concept. For example, the error tracker 115 may be configured to execute as a standalone subsystem, which can be set up to monitor particular jobs representing both product builds and executions. Alternatively, the error tracker 115 can be configured to execute as a called service and run as part of the Source Code Management system's build job.

Referring again to FIG. 1, as illustrated therein, the IDE 150 includes a source code editor 160, a compiler 165, a debugger 170, build automation tools 175 and an interpreter 180. The IDE 150 illustrated in FIG. 1 is an example IDE and is not meant to limit embodiments of the present inventive concept. Some of the components included in the IDE may not be present or other components may be included in the IDE without departing from the scope of the present inventive concept. Furthermore, the IDE may offer intelligent code completion features. In addition to these components, some embodiments of the present inventive concept provide the error tracker 115 including an error database 185 and a data miner 187. The developer interacts with the IDE 150 and the error tracker 115 via the user interface/input devices 105 of the computing device 100.

In particular, the source code editor 160 is a text editor program designed specifically for editing source code written by developers. Some source code editors are stand alone applications and may not be provided in an IDE 160. The compiler 165 is a computer program (or set of programs) that transforms the source code written in a programming language (the source language) into another computer language (the target language) to transform the source code to create an executable program/application. Build automation tools 175 are used for scripting or automating a wide variety of tasks that software developers do in their day-to-day activities including, for example, compiling computer source code into binary code, packaging binary code, running tests, deployment to production systems, creating documentation and/or release notes and the like. Typically, developers used build automation tools 175 to call compilers from inside a build script versus attempting to make the compiler calls from the command line. The interpreter 180 is a computer program that directly executes, i.e. performs, instructions written in a programming or scripting language, without previously batch-compiling them into machine language. Finally, the debugger 170 or debugging tool is a computer program that is used to test and debug programs.

Traditionally, defect tracking software is configured to allow the bug to be described in sufficient detail and to assign the bug to be handled by a person to fix the bug. Traditional defect trackers provide a status associated with the bug, for example, in progress, awaiting verification and the like; a work log for logging progress and communications; and reports including charts and graphs. However, these traditional tools do not allow a developer to encounter and resolve errors in the source code in real time.

Referring again to FIG. 1, the error tracker 115 in accordance with embodiments of the present inventive concept, is not a typical defect tracker and is not meant to replace a good, integrated, defect tracking software. Thus, embodiments of the present inventive concept provide an additional development tool that may reduce the need for opening up issues by the testers in the test environment by resolving issues at the development side before the testers receive the compiled code. Accordingly, the error tracker 115 in accordance with embodiments of the present inventive concept is used by the developer and may be a precursor to the use of a traditional defect tracking system.

In particular, the error tracker 115 is configured to store all errors (build or run-time in the IDE) in the error database as the errors are encountered. The error tracker 115 may store two types of errors in the error database 185 compilation errors and run-time errors observed in the IDE. As discussed above, as used herein, "run-time errors" refers to run time errors that are diagnosed at compile time in the IDE by the developer. Each error may be stored in the error database as a separate record. The record for a compilation error may include, but is not limited to: a location where the error occurred, for example, load module name, member name and line number (relative memory offsets may not be recorded); the error Message ID and Text, for example, the actual compilation error message generated; and a resolution recorded at the next compilation that the a developer makes where the compilation error does not occur. In some embodiments, the resolution may be recorded as changes between the code that failed (the code that produced the initial error) and the code that succeeded and add the difference into the row that represents the original error.

The record for run-time errors that occur in the IDE 150 may be more complicated to track and relate back to a specific code area. The following details may be included in the record for a run-time error in the IDE: a location, for example, load module name, member name and line number; an error message include the type of error that occurred together with any return and reason codes; and a resolution, which may be recorded at the next run that a developer makes where the error does not occur. Thus, it may compare changes between the code that failed and the code that succeeded and add the difference into the row that represents the original error.

Once the error database 185 is established as discussed above, the error tracker 115 is configured to retrieve the historical errors and their resolutions responsive to a real time error experienced by the developer as will be discussed in detail below with respect to FIGS. 4-8. Once the real time error occurs, the error tracker 115 is configured to locate historical errors in the error database 185 that are "relevant" to the current real time error and provide the most relevant errors and their associated resolutions as suggestions to the developer. Thus, the error tracker 115 provides suggested resolutions to compile and run-time errors as they occur by using the combined history of bugs and defects stored in the error database 185 to diagnose existing ones. As will be discussed further below, the top relevancy resolutions, for example, the top 3-5 resolutions that are the most relevant to the current error may be presented to the developer in a list, for example, as illustrated in FIG. 5 that will be discussed below. The developer may click on any one of the resolutions provided in the list for more details including the complete resolution text, consisting of the failing segment of source code and the change that corrected it as illustrated in FIGS. 6-8 that will be discussed below. In some embodiments, developers may tag a particular resolution as relevant or not, which may improve the relevance of future matches.

The developer may be presented with the list of possible resolutions for each error encountered after the source code is compiled. As discussed above, the list may be provided in order of relevance. In some embodiments, a relevancy score can be calculated for each error/resolution pair in the error database 185. Relevancy may be based on, for example, the similarity of error messages; code location (compared to last change made); tagging, i.e. tags created by developers including helpful resolution suggestions; a date of the error, the older the logged item, the less relevant and the like.

The developer may examine each resolution in the list to see what the error was and what code was changed to correct it. If none of the resolutions provided address the particular error, the developer may request another list of the next most relevant resolutions. For example, the initial list may include resolutions having a calculated relevancy of 90 percent or higher. The second list may include the resolutions having a calculated relevancy of between 85 percent and 90 percent. This percentage may be customizable by the developer. Depending on the error, resolutions having a 50 percent relevancy may be useful in some contexts. The data miner 187 may be used to calculate the relevancy scores of the particular error/resolution pairs. However, the data miner 187 is not limited to this functionality and may be used to obtain any relevant information that may be contained with the error database.

In particular, when an error is encountered, the data miner 187 is used to explore the error database for error/resolution pairs having a particular relevancy score. As discussed above, what is considered relevant may be customizable by the developer. Thus, results don't have to be 100% relevant. It is up to the developer to judge whether what was suggested is helpful in debugging their error. The errors with the highest relevancy score are returned. In some embodiments, relevancy may be calculated by comparing the following metrics: the exact error messages; common libraries in use; locations in source code; age of the historical error; number of relevancy tags against historical error (and time since last tag); similarity of test cases that triggered the error; whether the resolution resulted in a successful build or not and the like.

In more detail, relevancy may be a probabilistic calculation. An error may be considered "exact" if it is a similar error, i.e., an error that is either identical or falls into the same category. Furthermore, later compile errors that are detected after the first compile error may also be used to establish the relevancy of the match. The exact location in the source code can be calculated with the aid of the load module map and listings. Offsets within load modules will likely change over time as more code is added. The age of error test should help compensate for this. Note that the location of the code change that solved the error may not be used in calculating the relevancy score. Errors in the database should decrease in relevancy over time. They may still appear if the other relevancy metrics are high, for example, identical error caused by identical test case. When the developer is presented with a particularly useful match, they can tag the solution. Solutions that have been tagged more often can be considered as likely more relevant when they appear as possible matches in the future. The age of relevancy tags is also used in the calculation. For example, solutions that were tagged more recently are considered to be more likely more relevant. Similarity of test cases that triggered the error are useful for calculating a more accurate relevancy for run-time errors. The test case that triggered the error is compared to those that triggered similar errors in the past in similar locations. The similarity is calculated based on consecutive steps, for example, historical error with identical first step, but with other matching steps, is less relevant than a historical error with identical first two steps, but no other similarities. The highest relevancy score would apply if the current failing test case is identical to that which triggered the historical error. Whether the resolution resulted in a successful build or not is not the most important metric, but could help to filter out some of those resolutions that caused new errors, even though they resolved the error in question.

As discussed briefly above, issues are not created by the developers. The error tracker 115 creates the issues automatically by logging compile and run-time errors in the IDE and their resolutions as they occur. Issues are not resolved or closed by developers. They are resolved and closed automatically as the compile and run-time errors are fixed by the developer. As discussed above, only some details are stored (error message and code) in the error database 185. The details that are stored for a resolved issue are primarily code related. Once an issue is resolved, the system is able to record the code that was changed to fix the defect. Thus, an issue can typically only be in one of two states unresolved and resolved. This is all done during product development and, thus, there is no concept of "Verification" or "Work in Progress" for the test engineers. Accordingly, some embodiments of the present inventive concept may speed up development by reducing time spent debugging build and run-time errors in the IDE.

Figure 2:
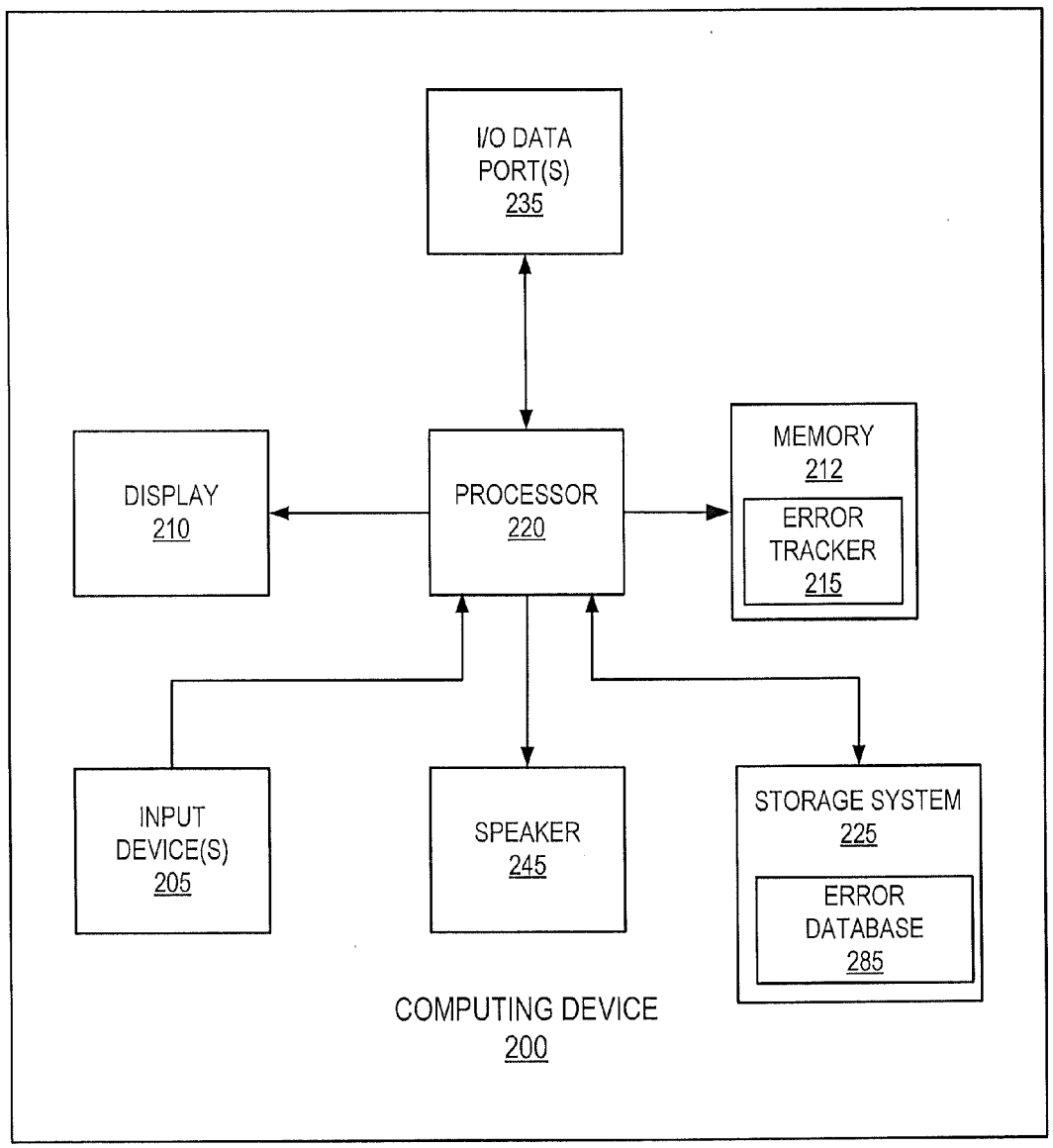
FIG. 2 is a block diagram that illustrates a computing device for use in software development in accordance with some embodiments of the present inventive concept.

Referring now to FIG. 2, a block diagram of a computing device 200 in accordance with some embodiments of the present inventive concept will be discussed. The device 200 may be used, for example, to implement the development environment 190 of FIG. 1 using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 may include input device(s) 205, such as a keyboard or keypad, a display 210, and a memory 215 that communicate with one or more processors 220 (generally referred to herein as "a processor"). The computing device 200 may further include a storage system 225, a speaker 245, and I/O data port(s) 235 that also communicate with the processor 220. The memory 212 may include error tracker 215 installed thereon. The error tracker 215 may be as discussed above and as described in greater detail herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage system 225 may include information used to perform various aspects of the present inventive concept. For example, the storage system may include the error database 285 discussed above with respect to FIG. 1. Although illustrated in separate blocks, the memory 212 and the storage system 225 may be implemented by a same storage medium in some embodiments. The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

Figure 3:
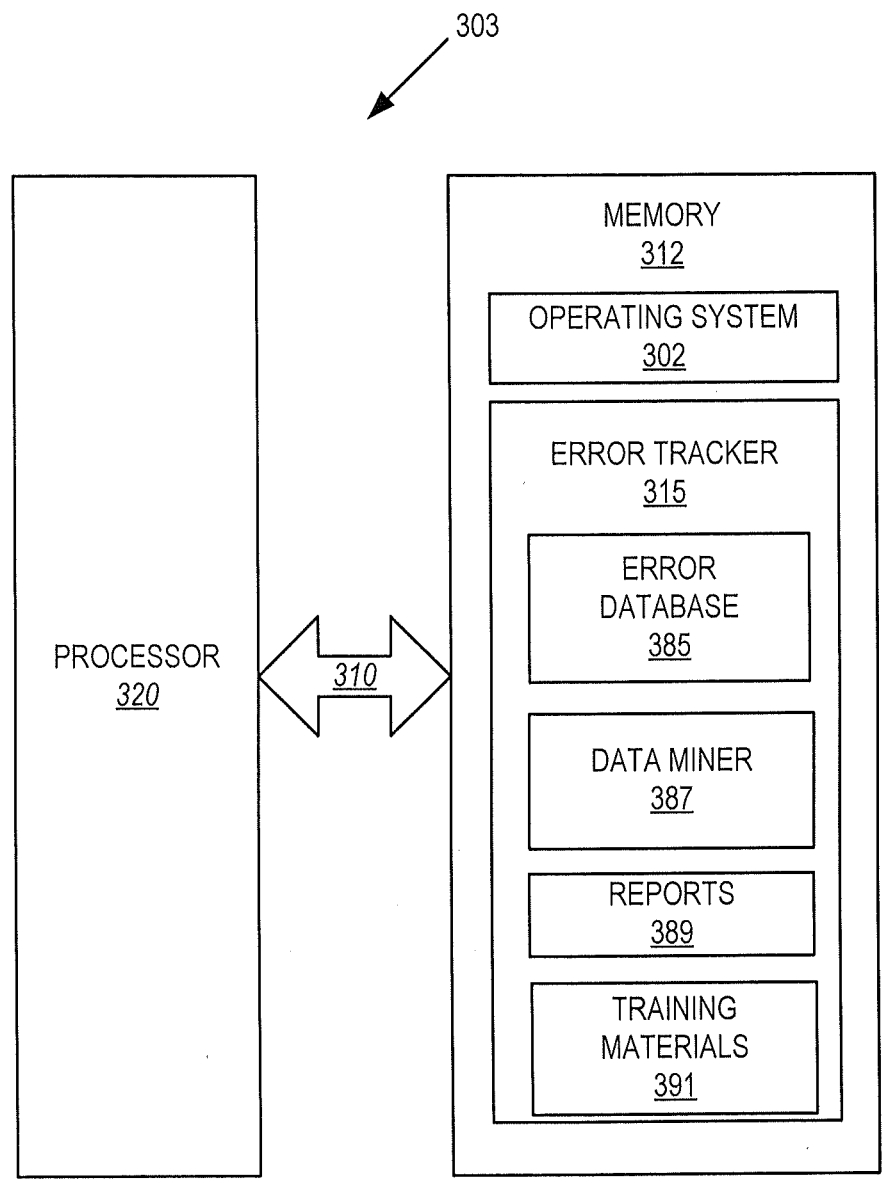
FIG. 3 is a block diagram that illustrates a software/hardware architecture for use in software development in accordance with some embodiments of the present inventive concept.

Referring now to FIG. 3, a block diagram of a computing system or environment for error tracking in accordance with further embodiments of the present inventive concept will be discussed. In particular, FIG. 3 illustrates a processor 320 and memory 312 that may be used in computing devices or other data processing systems, such as the computing device 200 of FIG. 2 and/or the IDE system 190 of FIG. 1. The processor 320 communicates with the memory 312 via an address/data bus 310. The processor 320 may be, for example, a commercially available or custom microprocessor, including, but not limited to, digital signal processor (DSP), field programmable gate array (FPGA), application specific integrated circuit (ASIC), and multi-core processors. The memory 312 may be a local storage medium representative of the one or more memory devices containing software and data in accordance with some embodiments of the present inventive concept. The memory 312 may include, but is not limited to, the following types of devices: cache, ROM, PROM, EPROM, EEPROM, flash, SRAM, and DRAM.

As shown in FIG. 3, the memory 312 may contain multiple categories of software and/or data installed therein, including (but not limited to) an operating system block 302 and an error tracker 315. The operating system 302 generally controls the operation of the computing device or data processing system. In particular, the operating system 302 may manage software and/or hardware resources and may coordinate execution of programs by the processor 320, for example, in providing IDE of FIG. 1.

The error tracker 315 is configured to carry out some or all of the functionality discussed above with respect to FIG. 1. In particular, the error tracker 315 includes the error database 385, a data miner 387, reports 389 and training materials 391. These aspects of the present inventive concept were discussed above with respect to FIG. 1 and will be discussed further below with respect to the remaining figures.

Although FIG. 3 illustrates example hardware/software architectures that may be used in a device, such as the computing device 200 of FIG. 2, to provide error tracking in accordance with some embodiments described herein, it will be understood that the present inventive concept is not limited to such a configuration but is intended to encompass any configuration capable of carrying out operations described herein. Moreover, the functionality of the computing device 200 of FIG. 2 and the hardware/software architecture of FIG. 3 may be implemented as a single processor system, a multi-processor system, a processing system with one or more cores, a distributed processing system, or even a network of stand-alone computer systems, in accordance with various embodiments.

Computer program code for carrying out the operations described above and/or illustrated in FIGS. 1-3 may be written in a high-level programming language, such as COBOL, Python, Java, C, and/or C++, for development convenience. In addition, computer program code for carrying out operations of the present inventive concept may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

An example of how the error tracker in accordance with some embodiments of the present inventive concept may operate will now be discussed with respect to FIGS. 4 through 8. Referring first to FIG. 4, a graphical user interface (GUI) screen shot of a source code editor in accordance with some embodiments discussed herein will be discussed. As illustrated in FIG. 4, in the "logs and others" window at the bottom of the screen, there is a tab 471 entitled Historical Solutions. This Historical Solutions tab 471 contains the list of resolutions discussed above associated with a particular error encountered when the source code was compiled. The list located when the Historical solutions tab 471 is selected contains the resolutions with the highest relevancy scores, for example, based on the criteria discussed above.

Referring now to FIG. 5, when the Historical Solutions tab 471 of FIG. 4 is selected, the developer may be presented with a table (FIG. 5) presenting the most relevant resolutions to the current error. As illustrated in FIG. 5, the table may indicate the error message, the file name, any tags added by previous developers and the age of the resolution. It will be understood that the table of FIG. 5 is provided for example purposes only and should not be used to limit the present inventive concept. The developer may click on the specific rows to obtain further details with respect to the error/resolutions presented therein.

Referring now to FIG. 6, when the developer selects the first resolution on the table of FIG. 5, the developer may be presented with the information provided in FIG. 6. In particular, the suggestion in FIG. 6 is based on an old syntax error that had been made over a year ago. Judging from the correction, it is apparent that the developer had incorrectly entered the name of the Graph datatype as Graph3D instead of Graph. This particular suggestion doesn't help, since we can verify that the abstract datatype name we provided in the constructor, PriorityQueue, is correct.

Accordingly, since the developer cannot use the first resolution in the table of FIG. 5, the developer may select the second resolution in the table of FIG. 5 and may be presented with the information of FIG. 7. As illustrated therein, this particular error was resolved via a forward declare of the Graph class. This is probably a more conventionally correct solution as only a pointer is being used to the graph object and not the object itself. Forward declaring the Graph class failing SubPath header will resolve the error encountered. Hence this is the closest match. As such, the developer might decide to tag this resolution since it was closest to the actual solution needed.

However, still interested in the resolutions provided, the developer may select the third resolution in the table in FIG. 5. When selected the developer may be presented with the information in FIG. 8. A common pattern is illustrated. While this particular resolution did not work when used, most likely due to the header guards, all three resolutions suggested were a result of the Graph pointer parameter passed to the constructor not being recognized. If, on the off-chance none of the resolutions had worked, the developer would still have gained insight into the cause of the problem.

Figure 9:
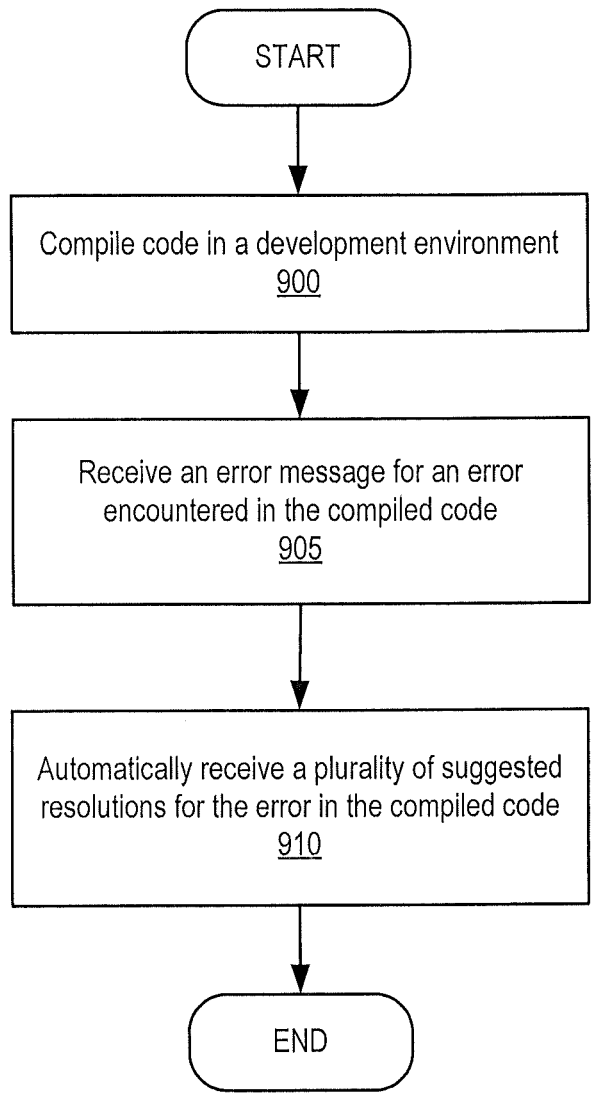
FIGS. 9-14 are flowcharts illustrating methods for error tracking during software development in accordance with some embodiments of the present disclosure.

Thus, according to some embodiments of the present inventive concept, bugs, resulting in compilation and runtime failures for a particular product may be logged in an error database as they occur together with a corresponding resolution, garnered from the next successful rebuild or run. The data in the error database may be analyzed and used in a variety of ways. For example, the data may be used for creating training material for new developers; data mining to gain insights into risk areas, for example, unclear subroutines that result in many bugs; and integrating with a comprehension tool (like a call-graph), to provide more useful information Operations for providing error tracking in accordance with some embodiments of the present inventive concept will now be discussed with reference to the flowcharts of FIGS. 9 through 14. Referring first to FIG. 9, operations for debugging code in a development environment begin at block 900 by compiling code in the development environment. The developer receives an error message for an error encountered in the compiled code (block 905). The developer automatically receives a plurality of suggested resolutions for the error in the compiled code (block 910). The plurality of suggested resolutions are based on past resolutions of errors associated with a plurality of developers stored in a common database. As discussed above, each error encountered in the IDE and the associated resolution are stored in an error database. The plurality of suggested resolutions are provided in order of relevancy based on a plurality of relevancy metrics as will be discussed further below.

Figure 10:
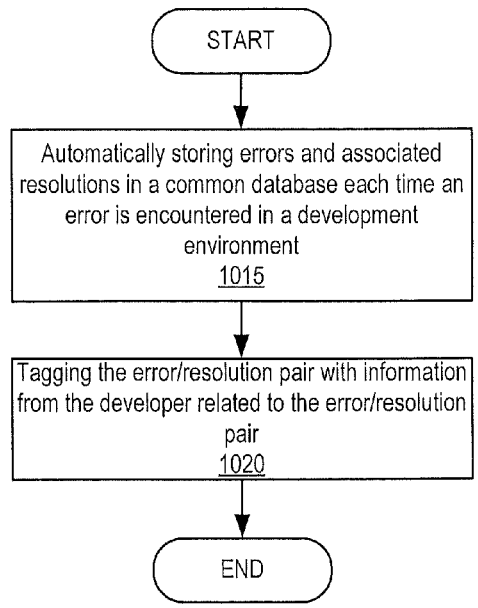

Referring now to FIG. 10, operations for storing the errors in the error database begin at block 1015 by automatically storing, for each error encountered by a developer in the development environment, the error and an associated resolution to the error in the common database. The record for a compilation error may include, but is not limited to: a location where the error occurred, for example, load module name, member name and line number (relative memory offsets may not be recorded); the error Message ID and Text, for example, the actual compilation error message generated; and a resolution recorded at the next compilation that the a developer makes where the compilation error does not occur. In some embodiments, the resolution may be recorded as changes between the code that failed (the code that produced the initial error) and the code that succeeded and add the difference into the row that represents the original error. Thus, the associated resolutions may be stored as redlined versions of the compiled code that received the error and code after the error is resolved. In some embodiments, the developer may provide a tag for the associated resolutions providing information related to the error and the associated resolution (block 1020). For example, the developer may indicate in the tag that the error/resolution pair was useful and corrected the problem.

Figure 11:
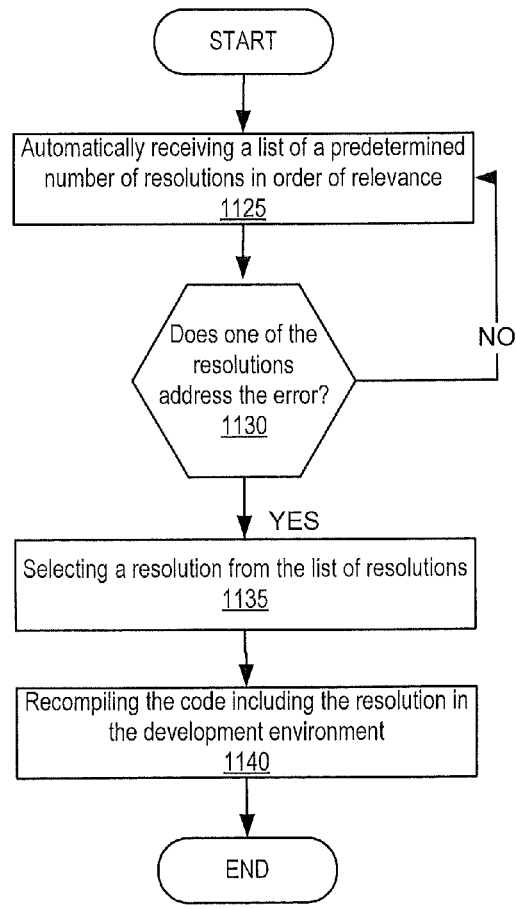

Referring now to FIG. 11, operations for automatically receiving a plurality of suggested resolutions begin at block 1125 by receiving a first list of a predetermined number of resolutions in order of relevance. In some embodiments, the order of relevance may be presented from most relevant to least relevant. The relevance may be calculated based on a plurality of relevancy metrics. It is determined if one of the resolution in the first list address/resolve the error (block 1130). If it is determined that one of the resolutions does not resolve the error (block 1130), operations return to block 1125 and a second list of a predetermined number of resolutions are provided to the developer in order of relevance. Operations of blocks 1125 and 1130 repeat until a resolution is found that addresses the error. If it is determined that one of the resolutions in the list addresses the error (block 1130), operations continue to block 1135 by selecting a resolution for the error from the list of resolutions and recompiling the code including the resolution in the development environment (block 1140).

Figure 12:
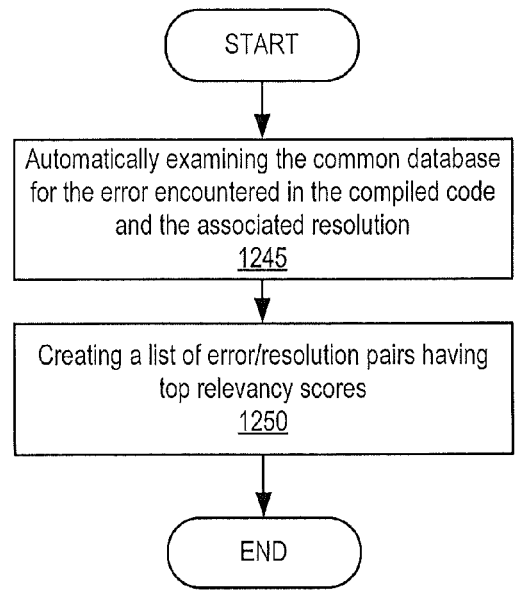

Referring now to FIG. 12, operations for receiving a first list of a predetermined number of resolutions may be preceded by automatically examining the common database for the error encountered in the compiled code and the associated resolution (block 1245) and creating a list of error/resolution pairs having top relevancy scores (block 1250).

Figure 13:
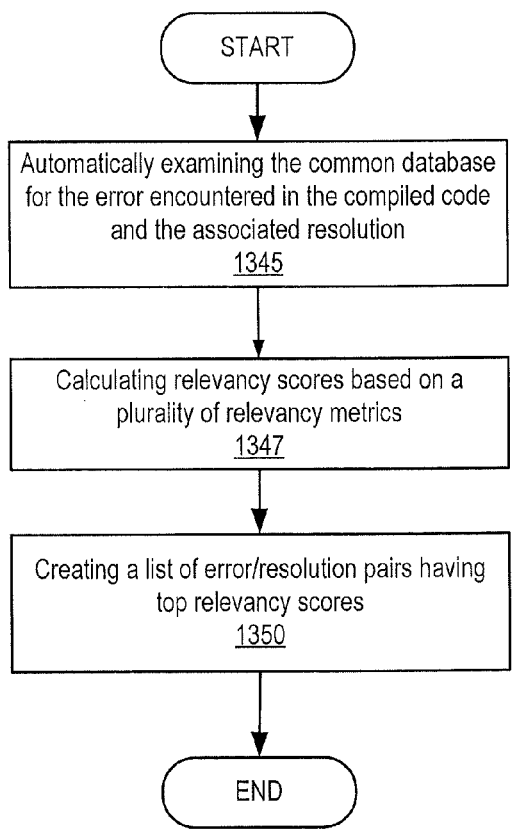

Referring now to FIG. 13, operations for receiving a first list of a predetermined number of resolutions may be preceded by automatically examining the common database for the error encountered in the compiled code and the associated resolution (block 1345). The relevancy scores may be calculated based on the plurality of relevancy metrics (block 1347). The plurality of relevancy metrics for an error may include exact error message for the error; common libraries in use; location in the code; age of the error in the common database; number of relevancy tags associated with the error in the common database; time since the error in the common database has been tagged; similarity of test cases that triggered the error; and whether the resolutions resulted in a successful compilation of the code. As discussed above, a value, for example, a percentage, which defines the top relevancy is programmable by the developer. A list of error/resolution pairs may be created having top relevancy scores (block 1350).

Figure 14:
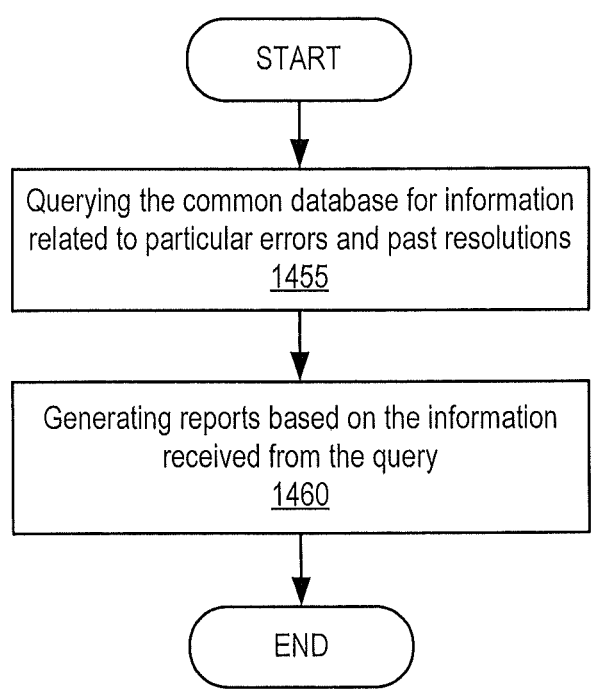

Referring now to FIG. 14, the common database may be queried for information related to particular errors and past resolutions (block 1455). Reports may be generated based on the information received from the query (block 1460).

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of debugging code in a development environment, the method comprising:
   compiling code in the development environment;
   displaying an error message for an error encountered in the compiled code;
   automatically receiving and displaying a plurality of suggested resolutions from a common database for the error in the compiled code if the common database contains suggested resolutions for the error, wherein the plurality of suggested resolutions is based on past resolutions of errors associated with a plurality of developers that are stored in the common database and wherein the plurality of suggested resolutions is provided in order of relevancy based on a plurality of relevancy metrics;
   enabling a user to select one of the plurality of suggested resolutions and displaying further details with respect to the selected one of the plurality of suggested resolutions, wherein the displayed further details comprise the error message, an age of the past resolution, a section of code associated with the past resolution that caused the error message and a redlined version of the section of code associated with the past resolution that shows at least one change made to the code that resolved the error;
   if one of the plurality of resolutions is selected from the common database to correct the error encountered in the compiled code, recompiling the code to determine if the error has been corrected, the code including code based on a selected resolution from the plurality of resolutions;
   enabling the user to tag one of the plurality of suggested resolutions as being relevant or not being relevant to improve the relevance of future suggested resolutions;
   repeating the recompiling and the enabling the user to tag if it is determined that the error has not been corrected until one of the error has been corrected and no more suggested resolutions are provided; and
   automatically storing the error and its associated resolution in the common database if it is determined that the error has been corrected such that each error encountered by a developer in the development environment and an associated resolution to the error are stored in the common database when it is determined that the error has been corrected.

2. The method of claim 1, wherein the associated resolutions are stored with a tag from a developer providing information related to the error and the associated resolution.

3. The method of claim 1, wherein automatically receiving a plurality of suggested resolutions further comprises receiving a first list of a predetermined number of resolutions in order of relevance, wherein the order of relevance is presented from most relevant to least relevant and wherein the relevance is calculated based on the plurality of relevancy metrics.

4. The method of claim 3, wherein automatically receiving a plurality of suggested resolutions further comprises receiving a second list of a predetermined number of resolutions in order of relevance responsive to an indication that none of the resolutions in the first list resolved the error.

5. The method of claim 3, wherein receiving a first list of a predetermined number of resolutions is preceded by:
   automatically examining the common database for the error encountered in the compiled code and the associated resolution;
   creating a list of error/resolution pairs having top relevancy scores.

6. The method of claim 5, further comprising calculating the relevancy scores based on the plurality of relevancy metrics, wherein the plurality of relevancy metrics for an error comprise:
   exact error message for the error;
   common libraries in use;
   location in the code;
   age of the error in the common database;
   number of relevancy tags associated with the error in the common database;
   time since the error in the common database has been tagged;
   similarity of test cases that triggered the error; and
   whether the resolutions resulted in a successful compilation of the code.

7. The method of claim 5, wherein a value that defines the top relevancy is programmable by the developer.

8. The method of claim 1, further comprising:
   querying the common database for information related to particular errors and past resolutions; and
   generating reports based on the information received from the query, the generated reports including information beyond debugging information for the code in the development environment.

9. The method of claim 8, wherein the generated reports include information used to glean architectural weaknesses and/or predict the most likely causes of failure.

10. The method of claim 1, wherein the common database does not include each line of code written by the plurality of developers over time.

11. The method of claim 1, wherein the training materials are separate from the method of debugging code.

12. A computer system for debugging code in a development environment, the system comprising:
   a processor; and
      a memory coupled to the processor and comprising computer readable program code that when executed by the processor causes the processor to perform operations comprising:
   compiling code in the development environment;
   displaying an error message for an error encountered in the compiled code;

automatically receiving and displaying a plurality of suggested resolutions from a common database for the error in the compiled code if the common database contains suggested resolutions for the error, wherein the plurality of suggested resolutions are based on past resolutions of errors associated with a plurality of developers that are stored in the common database and wherein the plurality of suggested resolutions are provided in order of relevancy based on a plurality of relevancy metrics;

enabling a user to select one of the plurality of suggested resolutions and displaying further details with respect to the selected one of the plurality of suggested resolutions, wherein the displayed further details comprise the error message, an age of the past resolution, a section of code associated with the past resolution that caused the error message and a redlined version of the section of code associated with the past resolution that shows at least one change made to the code that resolved the error;

if one of the plurality of resolutions is selected from the common database to correct the error encountered in the compiled code, recompiling the code to determine if the error has been corrected, the code including code based on a selected resolution from the plurality of resolutions;

enabling the user to tag one of the plurality of resolutions as being relevant or not being relevant to improve the relevance of future suggested resolutions;

repeating the recompiling and the enabling to tag if it is determined that the error has not been corrected until one of the error has been corrected and no more suggested resolutions are provided; and automatically storing the error and its associated resolution in the common database if it is determined that the error has been corrected such that each error encountered by a developer in the development environment and an associated resolution to the error are stored in the common database when it is determined that the error has been corrected.

13. The system of claim 12, wherein the associated resolutions are stored with a tag from a developer providing information related to the error and the associated resolution.

14. The system of claim 12, wherein automatically receiving a plurality of suggested resolutions further comprises receiving a first list of a predetermined number of resolutions in order of relevance, wherein the order of relevance is presented from most relevant to least relevant and wherein the relevance is calculated based on a plurality of relevancy metrics.

15. The system of claim 14, wherein automatically receiving a plurality of suggested resolutions further comprises receiving a second list of a predetermined number of resolutions in order of relevance responsive to an indication that none of the resolutions in the first list resolved the error.

16. The system of claim 14, wherein receiving a first list of a predetermined number of resolutions is preceded by:
automatically examining the common database for the error encountered in the compiled code and the associated resolution; and
creating a list of error/resolution pairs having top relevancy scores.

17. A computer program product for debugging code in a development environment, the computer program product comprising:

a non-transitory computer readable storage medium having computer readable program code embodied in the medium, the computer readable program code comprising:
computer readable code to compile code in the development environment;
computer readable program code to display an error message for an error encountered in the compiled code;
computer readable program code to automatically receive and display a plurality of suggested resolutions from a common database for the error in the compiled code if the common database contains suggested resolutions for the error, wherein the plurality of suggested resolutions are based on past resolutions of errors associated with a plurality of developers that are stored in the common database and wherein the plurality of suggested resolutions are provided in order of relevancy based on a plurality of relevancy metrics;
computer readable program code to enable a user to select one of the plurality of suggested resolutions and displaying further details with respect to the selected one of the plurality of suggested resolutions, wherein the displayed further details comprise the error message, an age of the past resolution, a section of code associated with the past resolution that caused the error message and a redlined version of the section of code associated with the past resolution that shows at least one change made to the code that resolved the error;
if one of the plurality of resolutions is selected from the common database to correct the error encountered in the compiled code, computer readable program code to recompile the code to determine if the error has been corrected, the code including code based on a selected resolution from the plurality of resolutions;
computer readable program code to enable the user to tag one of the plurality of suggested resolutions as being relevant or not being relevant to improve the relevance of future suggested resolutions;
computer readable program code to repeat the recompiling and the enabling the user to tag if it is determined that the error has not been corrected until one of the error has been corrected and no more suggested resolutions are provided; and
computer readable program code to automatically store the error and its associated resolution in the common database if it is determined that the error has been corrected such that each error encountered by a developer in the development environment and an associated resolution to the error are stored in the common database when it is determined that the error has been corrected.

18. A method of debugging code in a development environment, the method comprising:
compiling code in the development environment;
displaying an error message for an error encountered in the compiled code;
automatically displaying a plurality of suggested resolutions from a common database for the error in the compiled code based on the error, the plurality of suggested resolutions being based on past resolutions of errors that are stored in the common database and associated with a plurality of developers, wherein the plurality of suggested resolutions comprises a first list of a predetermined number of resolutions provided in order of user-customizable relevancy based on a plurality of relevancy metrics;

enabling a user to select one of the plurality of suggested resolutions and displaying further details with respect to the selected one of the plurality of suggested resolutions, wherein the displayed further details comprise the error message, an age of the past resolution, a section of code associated with the past resolution that caused the error message and a redlined version of the section of code associated with the past resolution that shows at least one change made to the code that resolved the error;

enabling the user to tag one of the plurality of suggested resolutions as relevant or not relevant to improve the relevance of future suggested resolutions;

if one of the plurality of resolutions is selected from the common database to correct the error encountered in the compiled code, compiling modified code to determine if the error has been corrected, the modified code including code based on a selected resolution from the plurality of resolutions;

repeating the automatically displaying of the plurality of suggested resolutions, the enabling the user to tag and the compiling of modified code if it is determined that the error has not been corrected until one of the error has been corrected and no more suggested resolutions are provided, wherein the automatically displaying the plurality of suggested resolutions includes displaying a second list of a predetermined number of resolutions in response to a user requesting another list of suggested resolutions;

automatically storing the error and its associated resolution in the common database if it is determined that the error has been corrected such that each error encountered by a developer in the development environment and an associated resolution to the error are stored in the common database when it is determined that the error has been corrected; and enabling data mining of the common database.

* * * * *